United States Patent [19]
Kim et al.

[11] Patent Number: 6,007,898
[45] Date of Patent: Dec. 28, 1999

[54] THERMOPLASTIC THREE-DIMENSIONAL FIBER NETWORK

[75] Inventors: Dai W. Kim, Chatham, N.J.; Joseph Steven Wiley Haas; William Edward Bessey, both of Charlotte, N.C.

[73] Assignee: HNA Holdings, Inc., Summit, N.J.

[21] Appl. No.: 09/046,165

[22] Filed: Mar. 23, 1998

Related U.S. Application Data

[62] Division of application No. 08/577,655, Dec. 22, 1995, Pat. No. 5,731,062.

[51] Int. Cl.[6] .............................. B32B 1/00; B32B 7/00; B27N 3/10
[52] U.S. Cl. .......................... 428/175; 428/178; 442/182; 442/189; 442/308; 264/257
[58] Field of Search ..................................... 428/175, 178, 428/107, 182, 113; 442/197, 188, 308, 182, 189; 264/257, 168, 239, 293, 299

[56] References Cited

U.S. PATENT DOCUMENTS

| | | | |
|---|---|---|---|
| Re. 31,345 | 8/1983 | Schwartzkopff et al. | 428/178 |
| 2,029,370 | 2/1936 | Heldenbrand | 428/178 |
| 2,627,644 | 2/1953 | Foster | 428/182 |
| 3,219,514 | 11/1965 | De Roysancour | 428/178 |
| 3,691,004 | 9/1972 | Werner et al. | |
| 4,104,430 | 8/1978 | Fenton | 428/175 |
| 4,128,684 | 12/1978 | Bomio et al. | 428/175 |
| 4,212,692 | 7/1980 | Rasen et al. | |
| 4,252,590 | 2/1981 | Rasen et al. | |
| 4,584,228 | 4/1986 | Droste et al. | |
| 4,631,221 | 12/1986 | Disslebeck et al. | 428/178 |
| 4,673,616 | 6/1987 | Goodwin et al. | |
| 4,822,663 | 4/1989 | Reott | 428/157 |
| 4,890,877 | 1/1990 | Ashtiani-Zarandi et al. | 276/146 |
| 5,158,821 | 10/1992 | Gebauer et al. | 428/174 |
| 5,296,289 | 3/1994 | Collins | |
| 5,364,686 | 11/1994 | Disslebeck et al. | 428/174 |
| 5,447,776 | 9/1995 | Disslebeck et al. | |
| 5,523,141 | 6/1996 | Fyler | 428/108 |

FOREIGN PATENT DOCUMENTS

| | | |
|---|---|---|
| 0324714 B1 | 7/1989 | European Pat. Off. |
| 0386387 B1 | 9/1990 | European Pat. Off. |
| 0386864 B1 | 9/1990 | European Pat. Off. |
| 0 469 558 A1 | 2/1992 | European Pat. Off. ......... D04H 1/00 |
| 0 559 969 A1 | 3/1992 | European Pat. Off. ......... D04H 1/54 |

*Primary Examiner*—Donald Loney
*Attorney, Agent, or Firm*—Alston & Bird LLP

[57] ABSTRACT

Three dimensional fiber networks which are semi-rigid and dimensionally stable are made from textile fabrics that have projections and optional depressions which are compressible and return to their original shape after being compressed. The fiber networks are made by the thermo-mechanical deformation of textile fabrics that are in turn made from thermoplastic fibers. The fiber networks have particular utility as cushioning and impact absorbing materials.

28 Claims, 2 Drawing Sheets

THERMOPLASTIC THREE-DIMENSIONAL FIBER NETWORK

This application is a division of Ser. No. 08/577,655, filed Dec. 22, 1995, now U.S. Pat. No. 5,731,062.

FIELD OF THE INVENTION

This invention relates to three-dimensional networks of thermoplastic fibers.

BACKGROUND OF THE INVENTION

Three-dimensional fiber networks are known. These are generally derived from textile fabrics that have been impregnated with a thermoset polymer or a low melting thermoplastic and then molded into the desired shape. For example, U.S. Pat. No. 4,631,221 describes a laminate containing a rigid three-dimensional fiber network having regularly arranged projections. The three-dimensional network is placed between two sheets of rigid material. The three-dimensional network used in the laminate is made by the deep-drawing of a sheet-like textile fabric to make projections. The textile fabric was previously impregnated with a thermoset resin and dried to yield a pre-preg, and is cured after deep-drawing. The textile fabric is made from a multifilament yarn so that a larger amount of resin can be absorbed in the interfilament regions. U.S. Pat. No. 5,364,686 describes a three-dimensional shaped material which is made from a fabric comprising a yarn that has thermoplastic fibers mixed with higher melting reinforcing fibers; the fabric is shaped by deep drawing at a temperature high enough to melt the lower melting thermoplastic material but not the reinforcing fiber to yield a three-dimensional structure which becomes rigid after it is cooled, possibly due to the fixing of fiber crossover points. Finally, U.S. Pat. No. 4,890,877 describes an energy absorbing structure for use in automobile doors, wherein the energy absorbing structure is a highly stretchable lightweight material that has been coated with a resin (e.g. a thermoset) and then molded so that it has a series of projections, which are preferably truncated cones. The structure after molding does not appear to have an open fiber network appearance.

The fiber network structures described above and elsewhere generally are rigid and are intended for use mainly as lightweight structural materials.

SUMMARY OF THE INVENTION

Three dimensional fiber network structures can be made that are semi-rigid and dimensionally stable, but have sufficient flexibility to be useful as cushioning materials. These fiber network structures are compressible, and when the compressive force is removed, the materials return to their original shape (i.e. they are resilient). These fiber network structures comprise filaments that are made of a single thermoplastic polymer and do not include a thermoset polymer. The networks are made up of a multiplicity of projections rising from the plane of the textile fabric from which the fiber network is made. Projections are portions of the textile fabric that rise above the base plane, generally in an abrupt way. Depressions, which are projections on the opposite side and in the opposite direction from the base plane, may optionally also be present. The projections and optional depressions have retained an open fabric-like appearance, consisting of discrete filaments which are generally not bonded at the intersections where the individual filaments cross over one another. There may be bonds at the intersections if the attachments are easily broken (i.e. they are not "tightly bonded") when the network is initially compressed, after which the network becomes resilient. The network is "resilient" if the projections and optional depressions substantially recover their shape after being compressed to 50% of their height. However, there may be minor changes in the shapes of the projections and optional depressions, as for example a change in the curvature of the edges at the top of the projection. As the density of tight bonds at the points at which the fibers cross over one another increases, the fiber network structure and the projections become more rigid, and the projections lose their resilience.

Because of the open structure of the textile fabric and the large void volume within the projections and/or depressions, the network has a low density compared with the polymer (generally less than about 10%, preferably less than about 5%) based on the amount of space occupied by the network. Air and other fluids can flow through the fiber network structure with little resistance. The filaments can be in the form of a monofilament having a diameter of at least about 0.1 mm, corresponding to about 100 dpf in the case of poly(ethylene terephthalate). The filaments used in the fiber networks can also be derived from multifilament yarns having approximately the same total diameter, provided that the individual filaments of the yarns have coalesced to larger filaments under heat and pressure during the shaping process, and further provided that the multifilament yarns have not become so firmly bonded at the points where they cross over one another that these bonds can't be broken when the fiber networks are compressed.

The fibers are made of a single thermoplastic polymer or copolymer (or optionally a blend or polymer alloy) that generally melts at a temperature in the range of about 80° C. to about 375° C. The fiber is not derived from hybrid yarn or bicomponent fiber. The polymer is preferably made into fiber by a melt spinning process. Preferred classes of polymers include polyesters, polyamides, thermoplastic copolyetherester elastomers, poly(arylene sulfides), polyolefins, aliphatic-aromatic polyamides, polyacrylates, and thermotropic liquid crystalline polymers.

The three-dimensional fiber network structure is generally made by deforming a textile fabric into the desired shape at a temperature high enough that the fibers can be permanently deformed, as would occur, for example, in a fiber drawing process. The temperature will generally be above the glass transition temperature (Tg), and, preferably will also remain below the melting temperature. The deformation is brought about using a thermomechanical process, which means the application of a mechanical force at an elevated temperature. The mechanical force can be applied using numerous methods, such as solid phase pressure forming, vacuum bladder match plate molding, interdigitation, deep drawing, use of a heated mold, and the like. Heat and pressure are applied for a sufficient time that the textile fabric is permanently deformed, but not for such a long time or at such a high temperature (e.g. well above the melting temperature) that the filaments coalesce, causing the shaped fiber network to lose its open net-like structure and resilience. The individual filaments in the three-dimensional fiber network structure still have retained much of their individual fiber-like appearance and properties.

The starting two-dimensional textile fabric that is utilized in making the three-dimensional fiber network structure is selected from any of the standard classes of fabrics, such as knit, woven, or non-woven textile fabrics. The type of fabric depends on the kind of resulting network structure that is desired. Knit fabrics have the advantage that their structure is readily deformed without excessive elongation of individual fibers, which leads to breakage of the fibers. They are also drapable. Woven fabrics have the advantage that they are more readily produced from larger diameter fibers, such as monofils.

DETAILED DESCRIPTION OF THE INVENTION

The three-dimensional fiber networks that have particular utility as cushioning materials are made up of a multiplicity of projections on the plane of the textile fabric from which the network is made. Depressions may optionally also be present on the opposite side of the fabric from the projections. Examples of three-dimensional fiber networks and methods of making them are summarized in U.S. Pat. Nos. 5,364,686 and 4,631,221, herein incorporated by reference. The projections and optional depressions can be in the shape of cones or truncated cones, pyramids or truncated pyramids having polygonal bases, cylinders, prisms, spherical elements, and the like. Generally, the apex points or surfaces of the projections define a plane parallel to the base plane. Similarly if there are also depressions, their apex points or surfaces define a second surface, such as a plane parallel to the base plane. As a result, the preferred three-dimensional networks define two surfaces or planes, one being defined by the tops of the projections and the other being defined by either the base plane or the plane or surface defined by the depressions. Furthermore, the projections and optional depressions are generally arranged in a uniform or repetitive pattern with a uniform spacing. However, the shapes, heights, sizes and spacings of the projections and optional depressions can be modified to suit a specific application. For example, they may vary to conform to a specific shape, such as the shape of the human foot for use in shoes, and they may vary in rigidity to increase or decrease their weight-bearing capacity. The projections and/or depressions can also be elongated along one direction of the plane, and in the extreme case, can run the entire length or width of the textile, in which case the projections are really corrugations, like those typically seem in cardboard. Non-corrugated structures are preferred for most applications.

Figure 1:
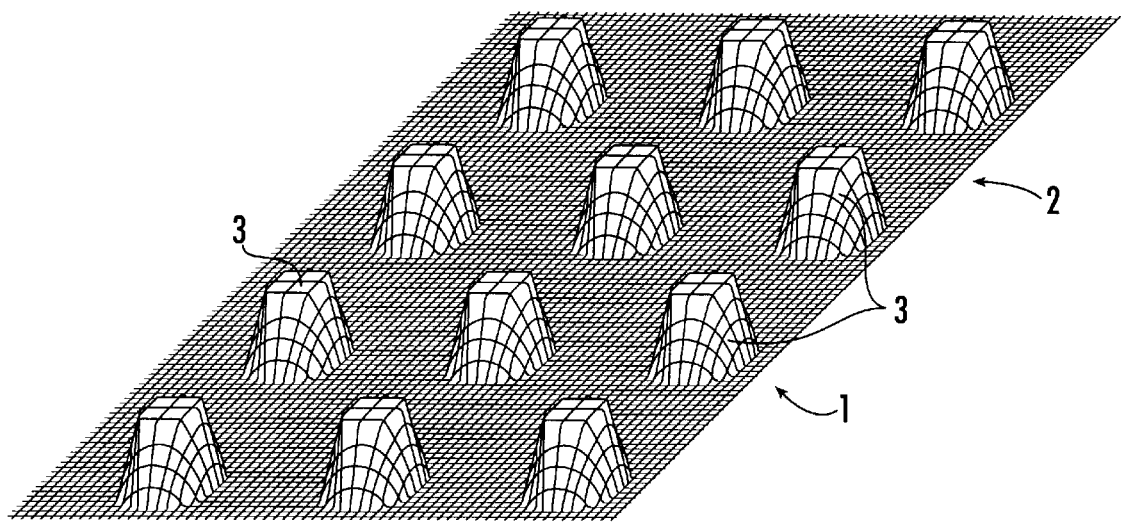
FIG. 1 shows schematically a section of a three-dimensional fiber network structure 1 having a multiplicity of "hat-shaped" projections 3 on base area 2. The open mesh structure of the fiber network is illustrated. These illustrative hat-shaped projections have a square base and square top, with the top having smaller dimensions than the base.
Figure 2:
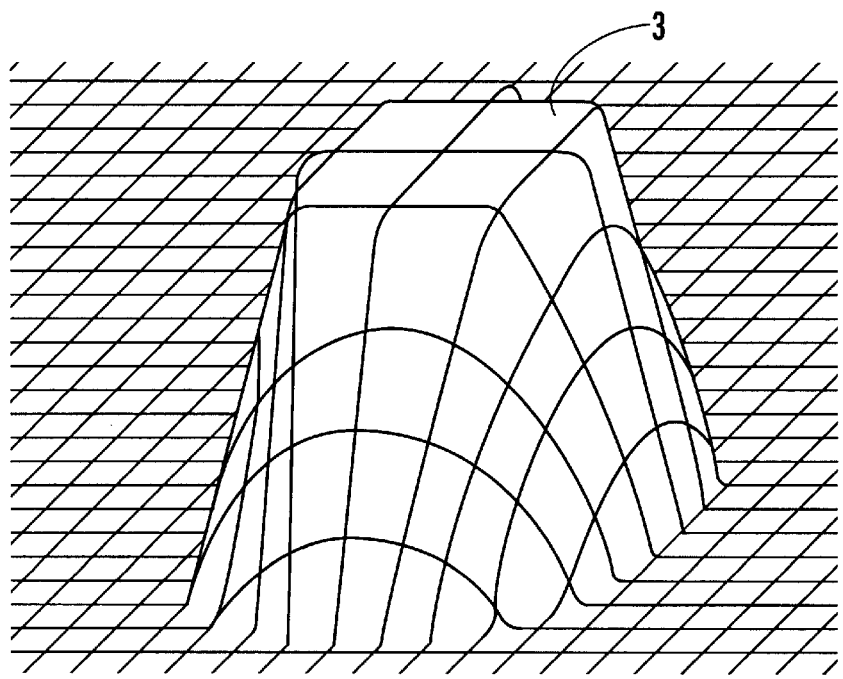
FIG. 2 schematically depicts an enlargement of one of the hat shaped projections 3 of FIG. 1, showing the widening of the mesh structure of the textile material which occurs in the area that is deformed.
Figure 3:
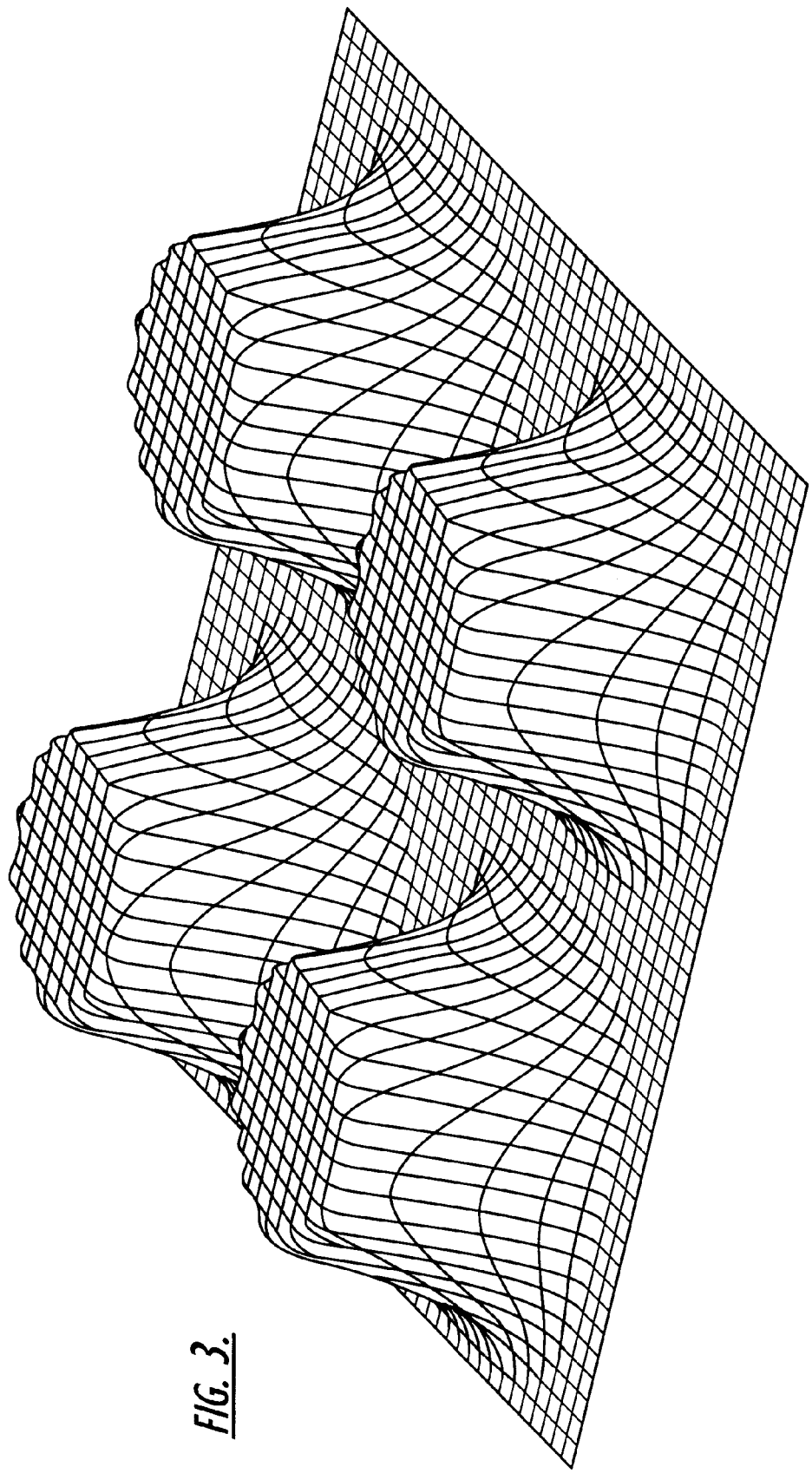
FIG. 3 schematically depicts an enlargement of four projections that are in the shape of truncated cones.

The sizes, heights, shapes and spacings of the pattern of projections and depressions affect the cushioning properties and "feel" of the three-dimensional networks. The rigidity of the individual fibers in the network structure also is a major factor in determining the cushioning properties of the three-dimensional networks, and the rigidity of the fibers in turn depends on the diameter of the filaments and the kind of materials (e.g. polymers) from which the filaments are made. For most applications, filament diameters are in the range of about 0.15 mm to about 0.7 mm. An example of a preferred structure of regularly spaced projections having a square base and a square top that has shorter sides than the base is shown in FIG. 1. Another preferred structure consists of a regular array of projections which are truncated cones of similar size and shape, as shown in FIG. 3, for example.

The polymers used as filaments in the three-dimensional fiber networks consist essentially of a single thermoplastic polymer rather than composites of a reinforcing fiber and a matrix polymer, such as a thermoset, which have been utilized previously for making rigid networks. The polymers may include minor amounts of additives, such as flame retardants, spinning lubricants, and the like. The thermoplastic polymers generally have a melting temperature in the range of about 80° C. to about 375° C., preferably about 150° C. to about 350° C. Thermoplastic polymers that are preferred include: (1) polyesters of alkylene glycols having 2–10 carbon atoms and aromatic diacids. Poly(alkylene terephthalates), especially poly(ethylene terephthalate) and poly(butylene terephthalate), are particularly preferred. Also preferred are poly(alkylene naphthalates), which are polyesters of 2,6-naphthalenedicarboxylic acid and alkylene glycols, as for example poly(ethylene naphthalate); (2) thermoplastic copolyetherester elastomers, described in more detail below; (3) polyamides, especially nylon 6 and nylon 66, which are commonly used in making fibers, (4) poly (arylene sulfides), especially poly(phenylene sulfide); (5) polyolefins, particularly polyethylene and polypropylene; (6) aliphatic aromatic polyamides, such as polyamides derived from terephthalic acid and 2-methyl-1,5-pentanediamine; (7) polyesters derived from 1,4-cyclohexanedimethanol and terephthalic acid; and (8) thermotropic liquid crystalline polymers, such as for example polyesters derived from 6-hydroxy-2-naphthoic acid and 4-hydroxybenzoic acid.

Specific preferred polymers include poly(ethylene terephthalate) (PET), thermoplastic copolyetherester elastomers, nylon 6 and 66, and polypropylene. PET is widely available from many manufacturers, including Hoechst Celanese Corporation, Somerville, N.J. The PET should be of high enough molecular weight to be suitable for spinning into fibers; generally a molecular weight corresponding to an intrinsic viscosity (I.V.) of at least about 0.6 dl/gm is suitable, where the I.V. is determined by measuring the relative viscosity of a 4% solution (weight/volume) in o-chlorophenol at 25° C. The relative viscosity is then converted to intrinsic viscosity. Polypropylene and nylons are also widely available from many manufacturers.

Thermoplastic copolyetherester elastomers, also referred to as thermoplastic elastomers, consist essentially of a multiplicity of recurring long chain ether ester units and short chain ester units joined head-to-tail through ester linkages. The long chain ether ester units are made up of poly(alkylene oxide) glycol units attached by way of ester linkages to terephthalic and/or isophthalic acid. The short chain ester units are the product of the reaction of a short chain glycol with isophthalic and/or terephthalic acid. The short chain ester units make up about 15% to about 95% by weight of the thermoplastic elastomer. Thermoplastic elastomers used in making the three-dimensional fiber networks are well known and are described in numerous references, including U.S. Pat. Nos. 3,023,192, 3,651,014, 3,763,109, 3,766,146, 3,784,520, 4,355,155, 4,405,749 and 4,520,150. Poly(tetramethylene oxide) glycol, also known as poly-THF, is the preferred poly(alkylene oxide) glycol for the long chain ether ester units. The preferred glycol in the short chain ester units is a mixture of 1,4-butanediol with up to about 40% by weight of 1,4-butenediol. Most preferably, the short chain glycol is only 1,4-butanediol. The preferred aromatic diacid used in making the short and long chain ester units is terephthalic acid containing up to about 20% isophthalic acid. Most preferably, terephthalic acid is the only diacid that is present. Thermoplastic copolyetherester elastomers that are composed of long chain ether ester units of poly-THF and terephthalic acid and short chain ester units of 1,4-butanediol and terephthalic acid are commercially available from Hoechst Celanese Corporation under the RITEFLEX® trademark.

Many of the polymers listed above, such as PET and nylon are flammable. Since many of the uses of these materials are in vehicles, homes, furniture, and apparel, the polymers will often need to have a flame retardant additive included. Most flame retardants come from one of six chemical classes: aluminum trihydrate; organochlorine compounds; organobromine compounds; organophosphorous (including halogenated phosphorus) compounds; antimony oxides; and boron compounds. Flame retardants can also be divided into additives which are blended with the substrate, and reactives, which are chemically bound to the substrate during polymerization in a separate step. Polymers that contain reactives as comonomers may contain up to about 10 mole % of the flame retardant monomers in the polymer composition. Other kinds of flame retardants that are sometimes used include intumescent coatings, sulfur or sulfur compounds (e.g. ammonium sulfamate and thiourea compounds) and oxides and carbonates of bismuth, tin, iron, and molybdenum. All of the above classes and kinds of flame retardants are reviewed in an article entitled "Flammability," by R. G. Gann, et al., in *Encyclopedia of Polymer Science and Engineering*, Second Edition, Volume 7, John Wiley and Sons, New York, 1987, pages 184–195. For PET, the preferred flame retardant is a reactive phosphorous compound that is incorporated into the polymer structure during polymerization and is available from Hoechst AG under the name Oxa-phospholane (a solid) or Oxa-phospholane Glycol Ester (a solution). The Oxa-phospholane products contain 2-carboxyethylmethylphosphinic acid as the free acid or as one or more ethylene glycol esters and diesters of the phosphinic acid. The 2-carboxyethylmethylphosphinic acid is incorporated into the polyester backbone at a level of up to about 5% of the polyester monomer units and acts as a flame retardant. The reactive phosphinic acid and its use as a flame retardant monomer are in U.S. Pat. Nos. 4,033,936 and 3,941,752, incorporated herein by reference.

The spacing, size, height, and shape of the projections and optional depressions, the diameter of the filaments, and fabric construction are chosen to give the desired cushioning properties for the specific application. The shapes of the deformations also depend on the process used to make them. For example, in a deformation process in which the textile fabric is held against a plate with round holes and a cylindrical rod is pushed through the hole on the same side as the textile fabric, so that the textile fabric is pushed through the hole, the projections that are made in the textile fabric will be in the shape of truncated cones (i.e., the base and top of the projections will both be round), with the diameter of the top of the cone being the diameter of the rod that pushes the textile through the hole. Similarly, if a plate with square holes and a rod with a square cross section is used, the projections will be "hat-shaped".

The fiber networks described herein are lightweight, durable and breathable. They are springy and resilient which means that they can be compressed (preferably repeatedly) without a significant loss in properties. Depending on the stiffness of the fibers and the sizes of the projections, they may be used as cushioning materials, as impact absorbing materials, or as semi-rigid support materials. Because they are generally made of only one polymer, such as PET, they can be easily recycled after use with other recyclable plastics, (e.g. bottles in the case of PET). The fiber network materials can be used as single layers, they can be nested face to face, with the projections interlocking, or they can be stacked with the projections of one layer against the base plane of the next layer or with the base planes of the two layers against each other to provide thicker spacers and cushions. The materials having more than one layer can be bonded together by such methods as adhesive bonding or ultrasonic welding. The fiber network structures can be used as components or sub-components in numerous applications, including mattresses, mattress topper pads, infant mattresses and mattress covers to prevent suffocation, footwear, (sock liners, collar linings, and midsoles for shoes), pads for protective head gear, seat cushions such as for example automobile seats, wrappings for medical casts, protective braces, protective helmet liners, space/sound barriers for wall partitions and panels, protective packaging for electronics, automotive headliners which provide head cushioning and channels for wiring, liners for athletic and outdoor clothing, carpet pads, liners for women's brassieres and men's athletic supporters, and cushions for outdoor furniture, which dry easily and don't retain moisture. The invention is further described in the following non-limiting examples.

EXAMPLES

Example 1

RITEFLEX®640 copolyetherester elastomer having a melting temperature of about 180° C., obtained from Hoechst Celanese Corporation, was melt spun to yield a 0.20 mm (435 denier) monofil having the following properties. The fiber tenacity was measured by ASTM Test Method D-3822 as 2.8 gpd, with 98% elongation at break. The elastic recovery of the fiber was measured by the same test method as 100% after 100 cycles at either 20% or 50% elongation. The monofil was knitted into a textile fabric having a wale of 8 wales/inch and a weft of 42 course/inch.

The knit fabric was shaped into a three-dimensional structure by using a heated press plate. The press plate was a metallic plate having $\frac{3}{8}$ inch diameter holes, and was heated to about 160°–230° C. The fabric was pressed against the heated plate for 9 seconds, and pins that were $\frac{1}{4}$ inch in diameter were then pushed through the holes. This yielded truncated cone shaped projections on the fabric which were about $\frac{3}{8}$ inch in diameter at the base and $\frac{1}{4}$ inch in diameter at the top. The projections were about $\frac{3}{16}$ inches in height and were spaced in a square grid array with the nearest distance between the projections (center to center) being about $\frac{3}{4}$ inch.

This shaped fiber network had a soft springy feel and could be repeatedly compressed without a loss of springiness.

Example 2

RITEFLEX®672 thermoplastic copolyetherester elastomer, which melts at about 205° C., was obtained from Hoechst Celanese Corporation, and was melt spun into 823 denier monofil (about 0.28 mm in diameter). The tenacity at break of the fiber was 2.4 gpd, and it had an elongation at break of 87%, as measured by ASTM Test Method D-3822. The elastic recovery of the fiber, measured by the same method, was 100% after 100 cycles at either 20% or 50% elongation.

The fiber was knitted into a fabric having the same wale and weft as that in Example 1. The fabric was deformed into a three-dimensional network using the press plate apparatus of Example 1 under the same conditions as in Example 1. This shaped fiber network also had a soft springy feel and could be repeatedly compressed without a loss of springiness.

Example 3

Commercial PET that was made for use in textile fabrics was melt spun into a 0.182 mm monofil (about 321 denier). The monofil was then made into a plain knit fabric with 16 wales and 24 courses per inch.

The fabric samples were deformed into a three-dimensional network using a similar kind of apparatus as described in Example 1, but having ¼ inch holes in the press plate and ⅛ inch diameter cylindrical pins to yield conical projections with flat tops. The base and tops of the projections were the same as the diameter of the holes in the base plate and the diameter of the pins. The projections were arranged in a square grid array and were separated by ½ inch (center to center). The height of the projections was about ¼ inch. The projections were made by heating the base plate and the pins to 240° C. and pressing the fabric through the holes for about 30 seconds. The deformed fabric was resilient and had a comfortable, springy feel when pressed down by hand, and retained its feel even after multiple compressions.

Example 4

A series of poly(ethylene terephthalate) (PET) fabric samples (both knit and woven) were made into three dimensional fiber network materials by the method of pressing the fabric against a heated base plate having a square grid array of evenly spaced holes at about 200° C. for two minutes and then pushing the fabric through holes in the base plates using cylindrical pins that were heated to about 180° C. The pins were kept in place (projected through the holes at temperature) for 15 seconds before being withdrawn, except in Sample No. 4 (below), where the pins were kept in place for 600 seconds. This resulted in three-dimensional networks of cone-shaped projections with flat tops which were evenly spaced and in which the bases of the projections had the diameter of the holes and the tops of the projections had the diameter of the pins. The heights of the projections (the thickness of the samples) was somewhat less than the depth of the penetrations through the holes by the pins due to shrinkage after the mechanical force was removed. Both knit and woven fabrics were tested.

These samples were subjected to compression tests using a modification of methods that are used for polyurethane foams and latex foams. Samples of the materials were placed between the plates of an Instron tensile tester and then pre-loaded to a load of 0.02 psi. The distance between the plates at 0.02 psi of compression was defined as the thickness of the sample. The samples were then compressed to 60% compression for two cycles at test speeds of 0.2 in/min for samples 0.10–0.29 inches in thickness, 0.5 in/min for samples 0.30–0.69 inches in thickness, and 1.0 in/min for samples 0.70–1.39 inches in thickness. The two pre-cycles above made a significant change in two of the samples (Nos. 4 and 6 in Table 1); the precycling measurements are also reported for these two samples. Six minutes after the pre-cycling above, a compression test was run to 60% compression at the same speed as in the pre-cycling. Stress and percent compression were measured, and the stress at 25% and 50% compression was measured. These values are recorded in Table 1, along with the averages for runs where there were duplicate measurements. These measurements show an increase in stress with increasing compression, which is a characteristic that is desirable for cushioning applications.

The apparent volume was computed based on the thickness as measured at 0.02 psi above and the measured dimensions of the sample. This was used to compute the apparent density, which ranged from 0.016 to 0.067 gms/cc. By comparison solid PET has a density of about 1.4 gms/cc. Thus the apparent density of the three dimensional fiber network is less than about 5% of the density of solid PET (1.1%–4.8% in these examples). The apparent densities of the samples in gms/cc are also listed in Table 1; these can be converted to pounds/cu. ft. by multiplying by 62.4.

It is to be understood that the above embodiments of the invention are illustrative only and that modification throughout may occur to one skilled in the art. Accordingly, this invention is not to be regarded as limited to the embodiments disclosed herein.

TABLE 1

| | | | | | | | | | |
|---|---|---|---|---|---|---|---|---|---|
| | | | | | Compression Tests | | | | |
| Sample No. | Fabric Type[1] | Penetration (inches) | Fiber Diameter (mm) | Measured Thickness[2] (inches) | Network Spacings[3] (inches) | Apparent Density (gms/cc) | Specimen No. | Stress @ 25% Compression (psi) | Stress @ 50% Compression (psi) |
| 1 | Woven 37 × 37 | 0.313 | 0.25 | 0.195 | ½ × ¾ × 1 | 0.047 | 1 | 1.07 | 1.73 |
| | | | | | | | 2 | 1.11 | 1.73 |
| | | | | | | | avg | 1.09 | 1.73 |
| 2 | Woven 20 × 20 | 0.313 | 0.40 | 0.200 | ½ × ¾ × 1 | 0.065 | 1 | 2.22 | 3.26 |
| | | | | | | | 2 | 2.32 | 3.37 |
| | | | | | | | avg | 2.27 | 3.31 |
| 3 | Knit | 0.363 | 0.20 | 0.345 | ½ × ¾ × 1 | 0.023 | 1 | 0.27 | 0.79 |
| | | | | | | | 2 | 0.29 | 0.83 |
| | | | | | | | avg | 0.28 | 0.81 |
| 4 | knit | 0563 | 0.20 | 0.495 | ½ × ¾ × 1 | 0.016 | 1 | 0.53 | 0.90 |
| | | | | | | | 2 | 0.55 | 0.90 |
| | | | | | | | 3 | 0.82 | 1.00 |
| | | | | | | | —[4] | — | — |
| 5 | Woven 37 × 37 | 0.188 | 0.25 | 0.140 | ¼ × ⅜ × ½ | 0.064 | 1 | 5.44 | 8.01 |
| | | | | | | | 2 | 5.88 | 9.09 |
| | | | | | | | avg | 5.56 | 8.55 |

TABLE 1-continued

Compression Tests

| Sample No. | Fabric Type[1] | Penetration (inches) | Fiber Diameter (mm) | Measured Thickness[2] (inches) | Network Spacings[3] (inches) | Apparent Density (gms/cc) | Specimen No. | Stress @ 25% Compression (psi) | Stress @ 50% Compression (psi) |
|---|---|---|---|---|---|---|---|---|---|
| 6 | Woven 20 × 20 | 0.188 | 0.40 | 0.193 | ¼ × ⅜ × ½ | 0.067 | 1 | 13.73 | 23.45 |
|   |   |   |   |   |   |   | 2 | 20.21 | 34.07 |
|   |   |   |   |   |   |   | —[5] | — | — |
| 7 | knit | 0.313 | 0.20 | 0.195 | ¼ × ⅜ × ½ | 0.040 | 1 | 1.11 | 2.98 |
|   |   |   |   |   |   |   | 2 | 1.11 | 3.04 |
|   |   |   |   |   |   |   | avg | 1.11 | 3.01 |

[1]The knit fabrics were a plain Jersey knit having approximately 17 wales/inch and approximately 38 courses/inch. For the woven fabrics, the units are given in yarns per inch.
[2]At 0.02 psi
[3]Diameter at top of projection × diameter at bottom of projection × spacing (center to center). in inches.
[4]Pre-cycling significantly changes load curve characteristics. Specimens #1 and #2 were run with pre-cycling. Specimen #3 was run without pre-cycling.
[5]Pre-cycling significantly changes load curve characteristics. Specimen #1 was run with precycling. Specimen #2 was run without pre-cycling.

We claim:

1. A method of making a material suitable for cushioning, comprising the steps of
   (a) making a monofilament having a diameter of at least about 0.1 mm from a thermoplastic polymer;
   (b) making said monofilament into a knit, woven, or non-woven textile fabric; and
   (c) making a series of projections and optional depressions in said textile fabric by a thermo-mechanical process;
       wherein said projections and optional depressions are resilient, returning substantially to their original shape after being compressed by 50%.

2. The method recited in claim 1, wherein said monofilament is made by a melt spinning process.

3. The method recited in claim 1, wherein said thermo-mechanical process is carried out by application of a mechanical force at a temperature above the glass transition temperature of said thermoplastic polymer.

4. The method recited in claim 3, wherein said mechanical force is applied at a temperature below the melting temperature of said thermoplastic polymer.

5. The method recited in claim 1, wherein said textile fabric is a knit fabric.

6. The method recited in claim 1, wherein said textile fabric is a woven fabric.

7. The method recited in claim 1, wherein said projections and optional depressions have a shape selected from the group consisting of cones, truncated cones, pyramids having polygonal bases, truncated pyramids having polygonal bases, cylinders, prisms, spherical elements, and mixtures thereof.

8. The method recited in claim 1, wherein said projections have apex points or flat tops, and said apex points or flat tops define a surface.

9. The method recited in claim 1, wherein said filaments in said fabric cross over one another at intersections, wherein said filaments at said intersections are not bonded.

10. The method recited in claim 1, wherein said thermoplastic polymer has a melting temperature in the range of about 80° C. to about 375° C.

11. The method recited in claim 1, wherein the apparent density of said fiber network is less than about 10% of the density of said thermoplastic fiber.

12. The method recited in claim 1, wherein said thermoplastic polymer is selected from the group consisting of polyesters, polyamides, thermoplastic copolyetherester elastomers, poly(arylene sulfides), polyolefins, aliphatic-aromatic polyamides, polyacrylates, and thermotropic liquid crystalline polymers.

13. The method recited in claim 1, wherein said thermoplastic polymer is a thermoplastic copolyetherester elastomer comprising long chain ether ester units and short chain ester units joined head-to-tail through ester linkages.

14. The method recited in claim 13, wherein said long chain ether ester units consist essentially of the residues of poly(tetramethylene oxide) glycol and terephthalic acid and said short chain ester units consist essentially of the residues of 1,4-butanediol and terephthalic acid.

15. The method recited in claim 1, wherein said thermoplastic polymer is poly(ethylene terephthalate).

16. The method recited in claim 1, wherein said thermoplastic polymer is polypropylene, nylon 6, or nylon 66.

17. The method recited in claim 1, wherein said network also comprises depressions.

18. The method recited in claim 7, wherein said depressions have apex points or flat tops, and said apex points or flat tops define a surface.

19. The method recited in claim 1, said filaments having a diameter in the range of about 0.15 mm to about 0.7 mm.

20. The method recited in claim 1, wherein said thermoplastic polymer contains a flame retardant.

21. An article comprising a three-dimensional fiber network structure as a component or sub-component, wherein said three-dimensional fiber network structure comprises a textile fabric having a multiplicity of compressible projections, and optional depressions, wherein said projections and optional projections return substantially to their original shape after being compressed by 50%, said textile fabric comprising thermoplastic filaments which consist essentially of a thermoplastic polymer, said filaments having a diameter of at least about 0.1 mm.

22. The article recited in claim 21, said article being selected from the group consisting of mattresses, mattress accessories, footwear components, pads for protective head gear, cushions, wrappings and liners for medical casts, protective braces, protective helmet liners, space/sound barriers, protective packaging for electronics, automobile headliners, liners for clothing, carpet pads and athletic shoes.

23. The article of claim 22, wherein said mattress is an infant mattress.

24. The article of claim 22, wherein said mattress accessory is selected from the group consisting of mattress topper pads and mattress covers.

25. The article of claim 22, wherein said footwear components are selected from the group consisting of sock liners, collar linings, and midsoles.

26. The article of claim 22, wherein said cushions are selected from the group consisting of seat cushions, automobile seat cushions, and outdoor furniture cushions.

27. The article of claim 22, wherein said space/sound barrier is a wall partition or panel.

28. The article of claim 22, wherein said clothing is selected from the group consisting of athletic clothing, outdoor clothing, brassieres, and athletic supporters.

* * * * *

UNITED STATES PATENT AND TRADEMARK OFFICE
CERTIFICATE OF CORRECTION

PATENT NO. : 6,007,898
DATED : December 28, 1999
INVENTOR(S) : Kim et al.

It is certified that error appears in the above-identified patent and that said Letters Patent is hereby corrected as shown below:

Title page, [56] References Cited, U.S. PATENT DOCUMENTS, line 11, "Disslebeck et al." should read --Disselbeck et al.--.

Column 7-8, in Table 1, in Sample No. 4, second column, "knit" should read --Knit--; third column, "0563" should read --0.563--; in Sample No. 5, ninth column, second entry, "5.88" should read --5.68--.

Column 9, Table 1-continued, in Sample No. 7, second column, "knit" should read --Knit--.

Column 10, line 42, "claim 7" should read --claim 17--.

Signed and Sealed this

Seventeenth Day of October, 2000

*Attest:*

Q. TODD DICKINSON

*Attesting Officer*        *Director of Patents and Trademarks*